Dec. 24, 1946.　　V. W. SHERMAN　　2,413,003
HIGH FREQUENCY BAKING APPARATUS
Filed Dec. 11, 1944

INVENTOR.
VERNON W. SHERMAN

BY
ATTORNEY

Patented Dec. 24, 1946

2,413,003

UNITED STATES PATENT OFFICE 2,413,003

HIGH-FREQUENCY BAKING APPARATUS

Vernon W. Sherman, Summit, N. J., assignor to Federal Telephone and Radio Corporation Application December 11, 1944, Serial No. 567,690

1 Claim. (Cl. 219—47)

The present invention relates to the art of food preparation and more particularly to the heating or baking of dough products and the like by means of high frequency electrostatic heating action to the end of obtaining a more palatable product, to facilitate the regulation of the heating effects upon the products and to obtain predetermined and uniformly controlled heating for baking of foods.

It further includes as an object the provision of high frequency heating apparatus adapted for baking operations and the like and which in its operation will effect the heating responsive to the action of an electrostatic field for internal generation of heat within the product and simultaneously therewith to subject selected surfaces of the product to a higher degree of heat by heat radiation and conduction from an interposed dielectric plate arranged within the field.

The improved methods of heat treatment and apparatus for carrying out the improved operation may advantageously be employed in the baking of bread, cake or other like products with the employment of high frequency current so as to obtain the benefits of this type of heating. These include uniformity of heating within the mass incident to the internal generation of heat due to the resistance of the mass or product to the electric energy or current or to the action of electro-magnetic waves and likewise the permissible expediting of the baking operation. The latter is highly desirable for bakeries, quick service lunch rooms, railway diners and the like.

As is well known a characteristic of the baking of dough products by high frequency electrostatic fields is that the heat generated by current flow through the mass and/or displacement current within the mass results in a baked product having a highly desirable uniformity of texture but wherein the outer crust or toasting of the surface incident to the usual methods of baking is absent. While this may be advantageous with certain products it is at other times undesirable from the standpoint of taste and appearance. As an instance it may be desirable more closely to simulate the ordinary methods of cooking in the toasting of bread for sandwiches such as are in large demand at quick service lunch counters. Moreover in the use of high frequency heating apparatus for baking in this manner where the dough products during the baking operation is in contact with the surface of one or both of the electrodes the condition may exist that in the heating of the mass a portion of the surface thereof may be in contact with a relatively cool electrode surface having a deleterious effect upon the crust or surface of the product and particularly upon the action of the levening agent.

In the baking operation the article, which may be a dough product such as a bread, cake or cookie mixture, is positioned between the electrodes and customarily with an adjustable spacing between the upper electrode and the upper surface of the product or material which adjustment is instrumental in determining the amount of high frequency voltage impressed across the product and thereby also controlling the heating rate.

According to a feature of the present invention a materially improved product is obtained by interposing a sheet or plate of dielectric and heat insulator material between the electrodes and the product in the baking or toasting operation. This dielectric plate may be in contact with or have engagement with the upper and lower surface of the product and is made of a material such as glass, plastic, compo-board, having a dielectric constant such as to give the required excess of surface heating to the product to obtain the desired degree of toasting effect.

As will be readily understood as in the instance of bread toasting, the degree of surface heating or toasting may be, in accordance with the present improvements, accurately determined by the employment of dielectric plates varied as to composition and dielectric constant characteristics thus to obtain predetermined and uniform surface heating effects and differing to the desired degree from the heat produced within the mass.

The foregoing and other features and advantages of the present invention will be more fully understood by reference to the accompanying drawing wherein like reference characters are applied to the corresponding parts in the several views.

In the drawing—

Figure 1:
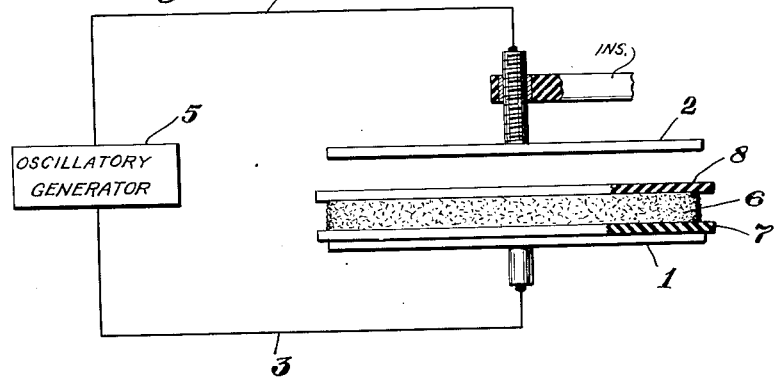
Fig. 1 is a diagrammatic illustration of the present invention in a simplified form.

Referring to the drawing in Fig. 1 there is shown a typical embodiment of the features of the invention comprising spaced electrodes shown as lower and upper metal plates, 1 and 2, of which the upper plate in the customary manner may be supported to be vertically adjustable with relation to the lower electrode. These electrodes as shown are connected by leads 3 and 4 to a high frequency oscillatory generator 5 which desirably is designed to operate in the megacycle range for the heating or baking operation.

To the end of remedying the aforesaid objections and to further provide for obtaining a controlled degree of surface heating there is in accordance with the present invention interposed between the electrode and the product a plate 7 of dielectric material which under the action of the electrostatic field will generate a relatively higher heat than that generated within the interior of the product and in consequence of which the surface or skin of the product will be further heated by radiation and heat conduction from the dielectric plate to produce a toasted skin effect, the degree of which is determined by the dielectric constant of the material of the plate as related to that of the product being baked. As will be obvious this dielectric plate 7 may be positioned to rest upon the lower electrode and if it is desired a second similar dielectric plate 8 can be placed on the upper surface of the product to effect a similar toasting of the upper surface. The degree of the relatively higher heat for toasting may be altered by the substitution of dielectric plates of different composition and dielectric constants.

Figure 2:
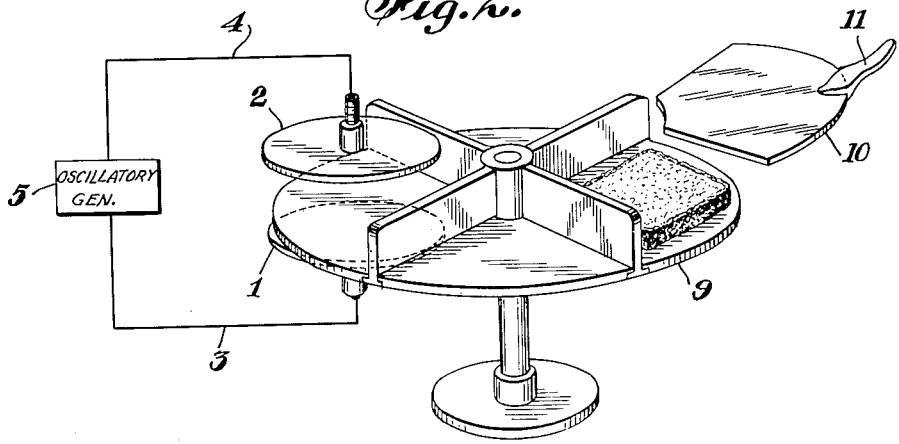
Fig. 2 is a view partially diagrammatic and partially in perspective illustrating a desirable practical embodiment of the features of the invention.

In Fig. 2 there is diagrammatically illustrated a desirable embodiment of the invention adapted for obtaining varied degrees of surface toasting in conjunction with the rate of high frequency heating as applied to the toasting of bread for lunch counter service. In this arrangement the customarily employed electrodes 1 and 2 are shown connected in circuit with the oscillator. For the supporting and conveying of the bread slices 6 or other food product there is provided a rotatable and segmental dielectric support composed of lower and upper horizontally positioned circular plate or disk members 9 and 10 which are supported and rotatable on a vertical supporting spindle. Each of the plate members 9 and 10 is formed with segmental portions of dielectric material which as will be understood may be of materials differing in their dielectric constant so as to produce varied degrees of toasting effect and may be suitably marked for the convenience of the operator. The correspondingly positioned segments of the lower and upper plates may be of like dielectric constant values. The arrangement as will be noted permits of placing the product between the dielectric segments and by rotation bringing them into properly interposed relation between the electrodes for the heating or toasting operation within the electrostatic field as described. For convenience in inserting the bread slices the segments of the upper plate may be removable and provided with heat insulating handles 11 and moreover may have a vertical movement within the support to permit of their resting directly upon the product.

Figure 3:
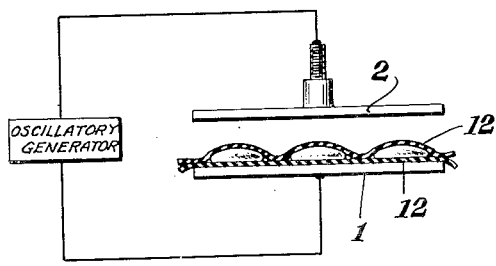
Fig. 3 is a vertical sectional view showing a modification.

In Fig. 3 there is shown a still further modification wherein in place of employing an interposed dielectric of flat plate form, flexible members 12 of suitable dielectric material are employed within which the product is placed to the end that the sides as well as the end surfaces of the product may receive the benefit of added heating for toasting effect.

This arrangement as illustrated is particularly suited for the baking of products such as cookies and the dielectric material may be a suitable paper or fabric of such character as to tolerate the required temperatures.

The described method and apparatus is accordingly adapted for the production of bakery products under the advantage of closely controlled heat regulation as offered by the high frequency method of heating while at the same time subjecting the surface of the product to a higher degree of heat so as to provide a crust or toasted skin. This may be to a degree as required for increased palatability, appearance and for protection to the product against excessive loss of moisture content.

While there is shown a preferred embodiment of the features of the invention it will be understood various modifications may be made without departing from the scope of the invention as defined in the claim. As illustrative, while the dielectric insert members are shown as of plane surface construction they may be of perforated or corrugated form more readily to permit of the escape of moisture from the heated surface.

What is claimed is:

A device for use in cooking foodstuffs that comprises a plurality of flat segmental elements, formed of materials having different dielectric properties and attached to each other along the radial edges whereby the elements collectively constitute a disc; means for supporting the disc in a manner such that free rotation in a horizontal plane about a vertical axis intersecting the center of the disc is permitted, a plurality of partition elements on and extending upwardly from the top surface of the disc, disposed radially along the localities of attachment of the segmental elements each to the other, defining segmental foodstuff-receiving zones; a plurality of segmental covers formed of materials having dielectric properties corresponding to the dielectric properties of the segmental elements and adapted to being received in the segmental zones in overlying relationship to foodstuffs placed therein; a first electrode mounted in spaced relationship beneath the disc and a second electrode mounted in spaced relationship above the disc in registering with the first electrode, the electrodes being arranged in a manner such that when the disc is rotated the segmental foodstuff-receiving zones are successively moved into the spacing between the electrodes; and means for supplying a high frequency oscillatory current to the electrodes whereby foodstuffs positioned between the segmental covers and the segmental elements and disposed between the electrodes are internally heated to complete cooking thereof and also are heated to a higher temperature in the portions of the foodstuff immediately adjoining the dielectric segment elements and the covers.

VERNON W. SHERMAN.